(12) United States Patent
Loberg

(10) Patent No.: US 7,277,830 B2
(45) Date of Patent: Oct. 2, 2007

(54) CAPTURING A USER'S DESIGN INTENT WITH RESOLVABLE OBJECTS

(75) Inventor: Barrie Arnold Loberg, Calgary (CA)

(73) Assignee: Dirtt Environmental Solutions Ltd., Calgary, Alberta (CA)

( * ) Notice: Subject to any disclaimer, the term of this patent is extended or adjusted under 35 U.S.C. 154(b) by 0 days.

(21) Appl. No.: 11/204,420

(22) Filed: Aug. 16, 2005

(65) Prior Publication Data

US 2006/0038815 A1 Feb. 23, 2006

Related U.S. Application Data

(60) Provisional application No. 60/602,233, filed on Aug. 17, 2004.

(51) Int. Cl.
*G06F 17/50* (2006.01)

(52) U.S. Cl. .................. 703/1; 345/426; 345/581; 345/630; 345/633; 434/72; 434/75; 434/79; 434/80

(58) Field of Classification Search ............ None
See application file for complete search history.

(56) References Cited

U.S. PATENT DOCUMENTS

| | | | |
|---|---|---|---|
| 5,255,207 A | 10/1993 | Cornwell | |
| 5,293,479 A * | 3/1994 | Quintero et al. ............ | 715/841 |
| 6,014,503 A | 1/2000 | Nagata et al. | |
| 6,459,435 B1 * | 10/2002 | Eichel ....................... | 345/588 |
| 6,662,144 B1 | 12/2003 | Normann et al. | |

(Continued)

FOREIGN PATENT DOCUMENTS

| | | |
|---|---|---|
| EP | 1098244 | 9/2001 |
| JP | EP1204046 A1 | 5/2002 |

OTHER PUBLICATIONS

Author: Josie Wernecke; Title: The Inventor Mentor: Programming Object Oriented 3D Graphics with Open Inventor; Release 2; Date: Jun. 19, 1997; Published on Web Site: www.cs.ualberta.ca/~graphics/books/mentor.pdf.*

Chan, et al.: "Design of a Walkthrough System for Indoor Environments from Floor Plans"; Proceedings of the 1998 IEEE Conference on Information Visualization, Jul. 29-31, 1998, pp. 50-57.

*Primary Examiner*—Paul Rodriguez
*Assistant Examiner*—Jonathan Teets
(74) *Attorney, Agent, or Firm*—Workman Nydegger

(57) ABSTRACT

Software for designing interior and/or exterior spaces efficiently ensures that user intent is captured in a timely, practical manner. When a user creates an input, such as selecting a shape of a table to put into a design space, the design software creates an initial object that is managed as part of a data structure. Generally, the initial object includes a type element having one or more options. Program code in the created initial object determines an appropriate option based on any number of factors including, but not limited to, elements of the user's original input. A subsequent child object with a set of independent program code is also created, which has as its type the option determined from the previous initial object. The subsequent object also determines its options based on attributes of the user's input, and creates any additional child objects where appropriate.

21 Claims, 5 Drawing Sheets

U.S. PATENT DOCUMENTS

| | | |
|---|---|---|
| 6,888,542 B1 | 5/2005 | Clauss |
| 2002/0093538 A1 | 7/2002 | Carlin |
| 2002/0144204 A1 | 10/2002 | Milner |
| 2004/0012542 A1 | 1/2004 | Bowsher |
| 2004/0145614 A1 | 7/2004 | Takagaki et al. |
| 2005/0081161 A1 | 4/2005 | MacInnes |

* cited by examiner

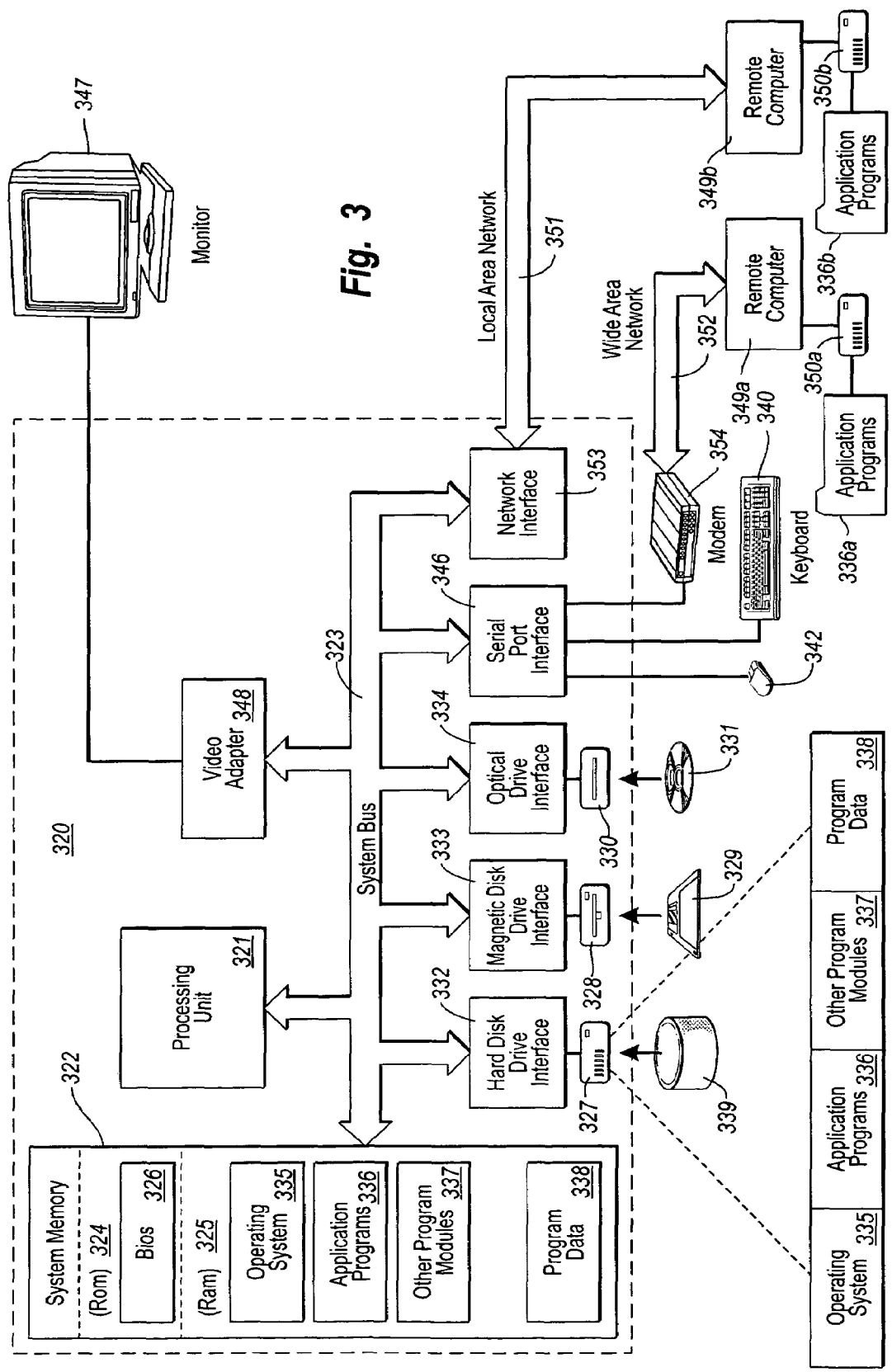

CAPTURING A USER'S DESIGN INTENT WITH RESOLVABLE OBJECTS

CROSS-REFERENCE TO RELATED APPLICATIONS

The present invention claims the benefit of priority to U.S. Provisional Patent Application No. 60/602,233, filed on Aug. 17, 2004, entitled "Method and Apparatus for the Selection, Organization and Configuration of Products through Object Oriented Design Intent", the entire contents of which are incorporated by reference herein.

BACKGROUND OF THE INVENTION

1. The Field of the Invention

This invention relates to systems, methods, and computer program products for modeling the design of commercial and residential interiors, and related spaces.

2. Background and Relevant Art

As computerized systems have increased in popularity, so has the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers (or "designers") use a wide range of design software for designing the aesthetic as well as functional aspects of a given residential or commercial space. In some cases, the designer might use some software programs that might be better suited for exterior design, and then use other software programs that might be better suited for interior design. For example, a designer might implement one software program to design an overall look of a building, and then use the software to design or position each of the functional components of the building, such as weight-bearing walls, trusses in a roof, positioning of electrical outlets, and so on. The designer might then use another software program, whether separately, or as an add-on to the first software program, to design functional walls for offices, design where to place work stations, design the position of desks, chairs, lamps, and so forth.

When designing the exterior and/or interior of a given residential or commercial space, the designer will ordinarily need to take care that each of the elements in the design are structurally sound when built. This is because typical design software allows spaces to be fairly configurable to suit the user's tastes without specific regard in many cases to whether the design will actually work. For example, one typical software design program might allow an architect to design a roof or ceiling that is ill-suited for the number or type of weight-bearing walls the architect has presently drawn. If the roof were actually constructed as designed by the architect, the roof or ceiling might collapse. In a situation such as this, however, the builder might indicate to the architect that the design is physically impossible or impractical, and ask for a redesign. This, of course, can lead to any number of inefficiencies.

Part of the problem with many design software programs that can lead to designing physically impractical structures is the notion that many such design problems require some drawing of a space in flat, two-dimensional space. For example, the outside of a building is designed in a view that emphasizes primarily only height and width, while a top ("plan") view of a building is designed in a view that emphasizes primarily only length and width. With views such as these, the designer will either need to independently visualize the three-dimensional spacing, or will need to perform a separate rendering of the design, if the software allows for it.

While three-dimensional rendering is available in some design software, three-dimensional rendering is fairly processing or resource intensive, and can take an additional amount of time. Furthermore, while three-dimensional rendering does allow the designer to "travel" around a design, such as an office, conventional three-dimensional rendering in design software does not typically allow the designer to peek around doors, look under tables, travel through hallways, or look up at ceilings, and the like very effectively. Three-dimensional design software also does not ordinarily accurately capture other natural variables that might affect the positioning of lamps, desks, or computer monitors based on the directly or spread of available natural light, and so on.

In addition, neither the three-dimensional rendering nor the two-dimensional drawing views are designed to accommodate necessary modifications to the objects or walls, based on real-world materials, or other important constraints. For example, a designer might place several L-shaped desks in a work space that are to be arranged back to back against a cubicle wall. In an ordinary environment, positioning the L-shaped desks together might involve a next step of removing a leg where one leg might be shared, or removing a bracket from one of the L-shaped desks for similar reasons. Accordingly, both the two-dimensional views and three-dimensional renderings of conventional design software captures only what is entered, and requires the designer to add or remove parts in a specific drawing to reflect real-world usage.

Once a design has been finalized by a designer, the designer will need to generate one or more parts lists that are reflective of the various dimensions and parts place in any of the design views. The parts list will be used for any number of cost estimate or ordering ends. Unfortunately, there is generally not a convenient way for an accurate parts list to be generated automatically from one or more design views. For example, even though a designer might use a conventional design software program to design one or more views of a space, the designer might need to independently deduce a parts list based from each of the views. In some cases, the designer might hire another person to identify each part, including wood or sheetrock for each wall, as well as the number of brackets or screws needed for each door hinge, desk mount, and the like.

Although there are some software programs that can produce parts lists from generated view, the parts lists are not always accurate. For example, in the case where two L-shaped desks will be adjoined in a work space, a conventional parts list that interfaces with the design software will not ordinarily be able to deduce the correct, specific amount of parts needed for each environment, such as in the case of shared components. Furthermore, the parts lists that are generated are difficult to read, and usually comprise some detailed information in text, or in a stock keeping unit ("SKU"), and do not readily inform the reader exactly what the image looks like. Thus, conventional, automatically generated parts lists must often be edited in painstaking fashion before they can be submitted to an order fulfillment company.

Accordingly, an advantage in the art can be realized with systems, methods, and computer program products that provide a designer with the ability to design spaces in a highly configurable, and yet user-friendly manner. In particular, an advantage can be realized with expert systems that are interoperable with other systems, and are configured to specifically capture a designer's intent in a manner that emphasizes physically possible or practical configurations.

BRIEF SUMMARY OF THE INVENTION

The present invention solves one or more of the foregoing problems in the prior art with systems, methods, and computer program products configured to automatically resolve a user's design choices in real time. In particular, implementations of the present invention relate to the creation of program objects in response to user input, where the program objects are configured to continually and automatically resolve a user's design choices in real-time and in consideration of real-world scenarios.

For example, a method in accordance with an implementation of the present invention includes creating an initial object based on user design input, where the user input has one or more attributes. The initial object also includes an initial type that relates to the one or more attributes. For example, a user selects a rectangle table to place into a design space, and the design software creates an object having "table" as its type. The method also involves determining an initial option for the initial type based on any of the one or more attributes. For example, the table can include options for a circular or rectangular shape. Program code of the "table" object can then determine an appropriate shape option based on any user input for present or subsequent values, such as a type of material that should be used for other elements of the table.

The method also involves creating a subsequent object based on the determined initial option, where the determined initial option provides a basis for subsequent type for the subsequent object. For example, once the rectangle options is determined for the initial table object, the design software creates another child object in the data structure that has "Rectangle Leg" as a type, and further has another set of options to be determined, such as for type of legs. The method further involves determining a subsequent option for the subsequent object based on any of the one or more attributes of the user input. For example, the "Rectangle" type object may have additional sub-options that would be used in other child objects, such as type of material or color, which can be considered by the program code in determining the leg option for the "Rectangle" type object. Thus, program code of the new object can make determinations of present options for the corresponding object based on any number of factors.

Along similar lines, a data structure in accordance with an implementation of the present invention includes a first object in a data structure created in response to a first user choice having one or more attributes. The first object has a first type component and a first option component that is determined by a set of program code in the first object based on the one or more attributes in the user input. The data structure also includes a second object that is related to the first object in the data structure. The second object includes a second type component that is based on the first option component of the first object, and a second option component that is determined by a set of program code in the second object based on the one or more attributes. The first and second objects are configured to independently resolve the corresponding type and option component of the first or second object based on an evaluation of one or more user design choices.

Accordingly, design software in accordance with the present invention provides for the creation of several independently resolvable objects in a composite data structure, each of which is configured to resolve one or more specific elements of a user's design choice. The objects automatically resolve prior, present, and ongoing user input, as appropriate, so that the user's design choices are represented in a physically or materially-possible way.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a schematic diagram of a suitable computerized environment for practicing one or more implementations of the present invention.

DETAILED DESCRIPTION OF THE PREFERRED EMBODIMENTS

The present invention extends to systems, methods, and computer program products configured to automatically resolve a user's design choices in real time. In particular, implementations of the present invention relate to the creation of program objects in response to user input, where the program objects are configured to continually and automatically resolve a user's design choices in real-time and in consideration of real-world scenarios.

For example, as will be understood from the present description and claims, one aspect of the invention relates to associating user input with a software object that includes type and option components. Another aspect of the invention involves automatically creating child objects based on one or more selected option components of the prior parent object. Still another aspect of the invention relates to ensuring that user selections accord with real-world values in real-time, such as by implementing program code in each of the parent and child objects in a data structure, which compares present user input with attributes from prior or original user input. As such, it will be understood that each object in the data structure can be configured to resolve itself, and that user input at one level in the data structure is appropriately propagated throughout other objects in the data structure, thereby continually resolving user input in an accurate and consistent manner.

Figure 1B:
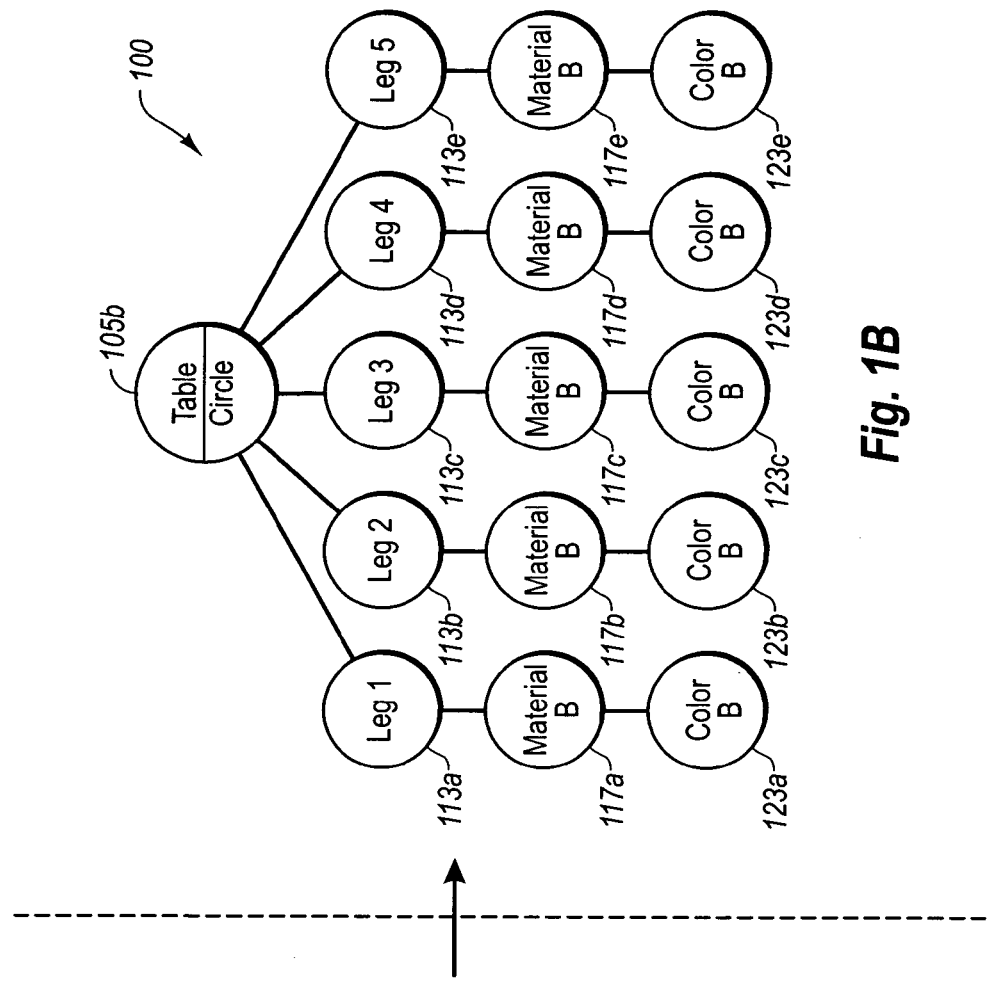
FIG. 1B illustrates a schematic diagram of the data structure shown in FIG. 1A after additional user input has caused a change in at least one of the plurality of objects.
Figure 1A:
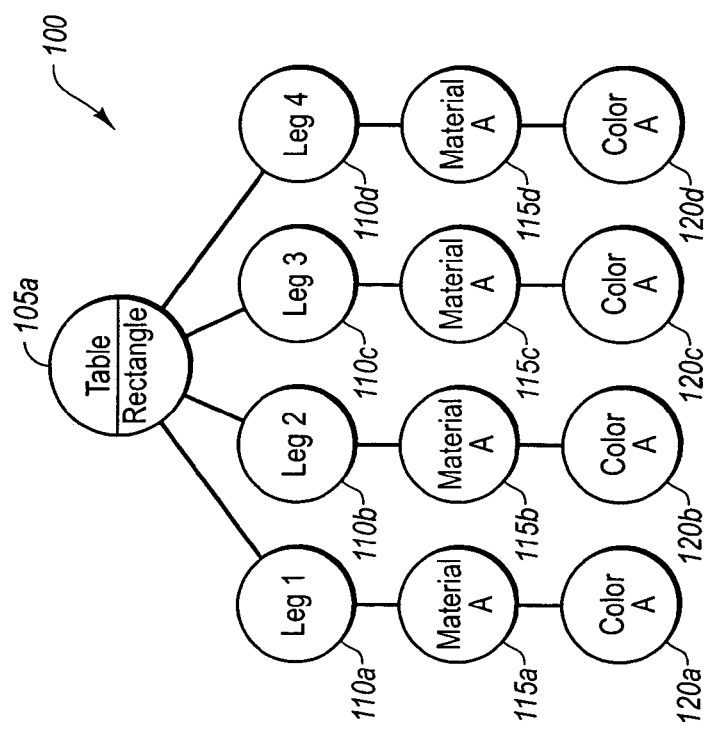
FIG. 1A illustrates a schematic diagram of a data structure comprising a plurality of objects created based on user input.

In particular, FIG. 1A illustrates a data structure in accordance with at least one implementation of the present invention in which one or more objects have been created in response to user input. In particular, FIG. 1A shows a data structure 100 having objects 105a, 110a-d, 115a-d, and 120a-d, which are created based on a user selection of a table in a design space. For example, in a design software program in accordance with an implementation of the present invention, a user can select a table icon in a selection area of a user interface, and then "drag and drop" or draw the table into a specific design space. Upon selection, or shortly thereafter, the design software will also create an initial object 105a for the table, which contains one or more "Type" and/or "Option" formats. The data from the initial object 105a is propagated throughout additionally created objects in the data structure 100.

For example, FIG. 1A shows that data structure 100 includes a table object 105a for a rectangular table. The table object 105a is related to additional child objects 110a-d for each of the four legs of the table. The legs objects 110a-d in turn are related to material objects 115a-d for the material of the legs. Furthermore, child objects 120a-d are related to, and depend from, the material objects 115a-d. Thus, as will be understood in greater detail in the following description, some objects (e.g., object 105a) are parent objects, some objects (e.g., 120a-d) are only child objects, and other objects (e.g., 110a-d, and 115a-d) are both parent and child objects.

Figure 1C:
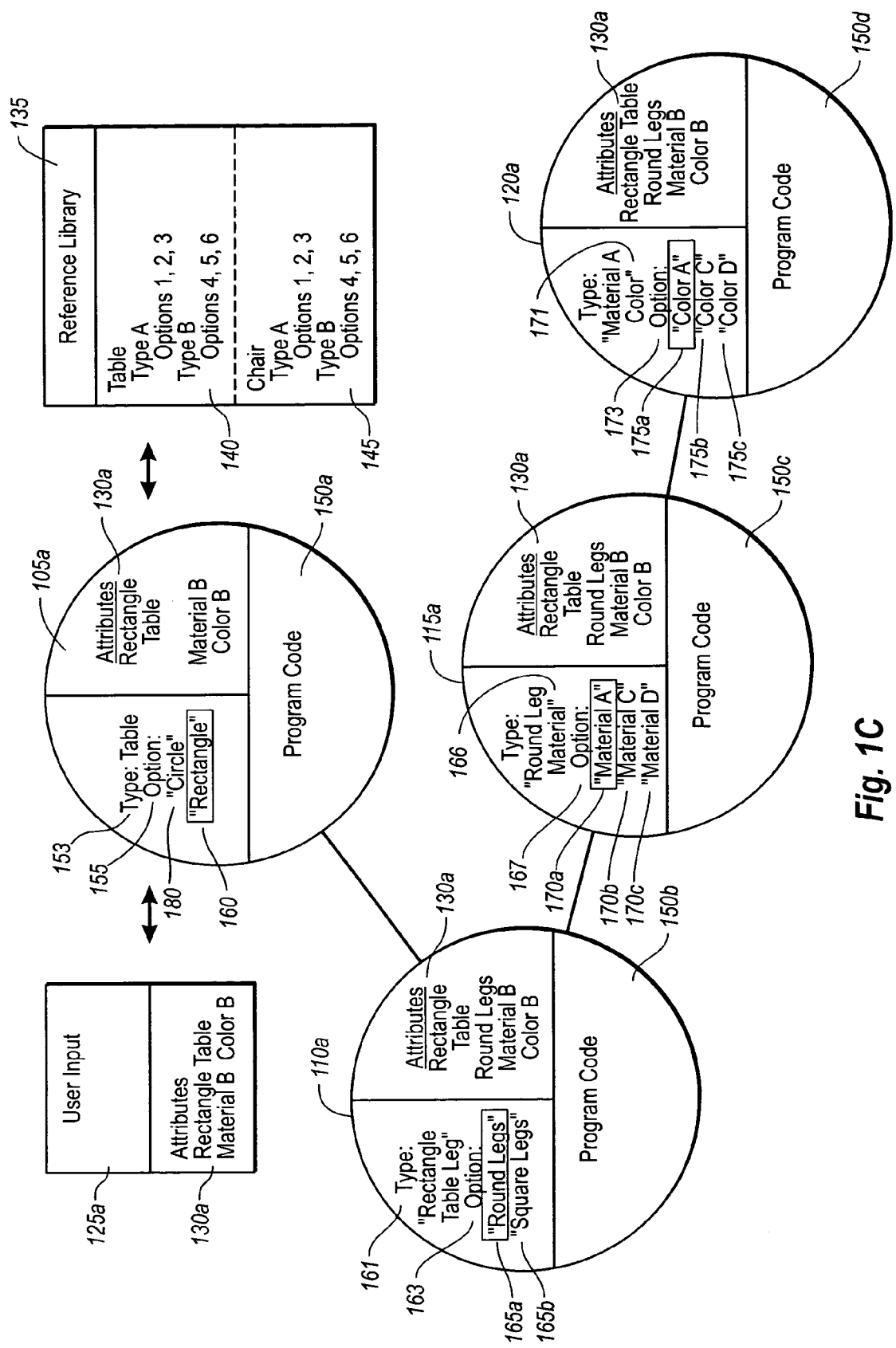
FIG. 1C illustrates a detailed schematic diagram of one or more of the objects shown in FIG. 1A.
Figure 1D:
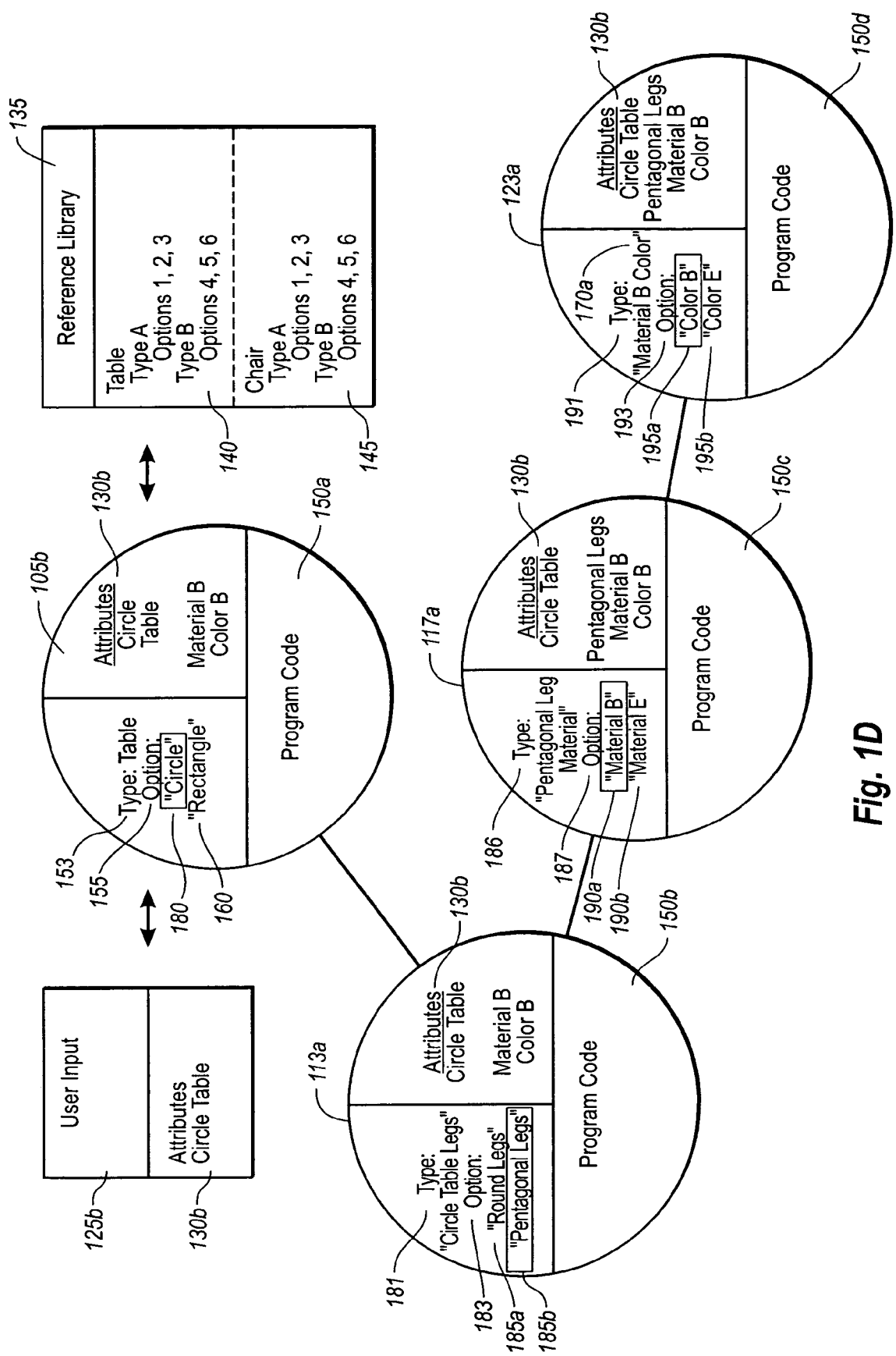
FIG. 1D illustrates a detailed schematic diagram of one or more of the objects shown in FIG. 1B.

For example, as will be understood with more particularity in FIGS. 1C-1D, each of these objects includes at least a "Type" component, and in the case of parent or parent/child objects, also will include an "Option" component. When an object includes a set of possible options (or "option component") for a "type," program code in the given object can be used to determine an appropriate option based any of an attribute of the user's input, and/or based on other reference information from a reference library (e.g. 135, FIG. 1C). The determined option for that object then provides a basis for one ore more possible "Type" components for a corresponding child object. For example, with respect to object 115a and object 120a, "Material A" is a determined option for object 115a, and, based on information in the reference library, provides a basis for a type component for object 120a. "Color A", which is a determined option for object 120a, is a possible option for the "Type" component that is based on the determined option of "Material A" in object 115a.

Some of the data in a given object, however, may not be represented precisely as the user selected it initially through the user interface. For example, the user might select a color or material for a rectangular table that is only available in circular tables. Alternatively, the user might inadvertently position the table icon in a design space in a physically impractical or impossible configuration, such as by placing the table partly on top of a wall line in a 2-D view. As will be understood more fully in FIGS. 1C-1D, the design software tries to memorize and/or modify the objects to accurately represent the user's design choice. As such, this can cause any of the objects in the initial data structure (FIG. 1A) to select or determine modified, appropriate representations of the user's initial input. Upon subsequent input from the user, each of the objects may again adjust the representation to allow the user's prior input that was originally modified or ignored in order to make still further modifications to the user's input for another appropriate representation.

For example, FIG. 1B shows the data structure 100 of FIG. 1A after there has been some change due, for example, to at least some different user input. In particular, FIG. 1B shows that the data structure 100 now shows that the table object 105b is now representative of a "Circle" table. This change in the initial object 105b has resulted in a corresponding change to the other objects in the data structure. For example, FIG. 1B shows that there are now five leg objects 113a-e, five corresponding material objects 117a-e, and five corresponding color objects 123a-e that are different in at least one respect from the child objects of FIG. 1A. That is, the user has now selected a circular table that comes only in five legs, and also comes with a number of other options for material and color that have been resolved by each of the objects 113a-e, 117a-e, and 123a-e. The objects of FIG. 1B have therefore made appropriate changes based on one or more attributes of the user's initial and/or subsequent input for material and color.

FIG. 1C illustrates a more detailed schematic diagram for creating one or more of the objects shown in FIG. 1A based on user input. In particular, FIG. 1C shows that user input 125a includes a request to create a table based on one or more initial attributes 130a. For example, attributes 130a include a request for placing a rectangular table in a design space. Although the user need not necessarily select every possible detail of the table when selecting the table itself, FIG. 1C shows that the user has also indicated a preference for "Material B" and for "Color B" to be associated with the table. The corresponding child objects that are then created will attempt to incorporate these user design choices as closely as appropriate.

For example, upon receipt of user input 125a, the design software creates object 105a having a type component 153 of "Table". The design software in turn coordinates with the reference library 135 to determine that the Type 153 of object 105a should have a set of options 155. In general, the reference library 135 can include all possible types, options, and/or corresponding sub-options that are possible in the design program based on any number of predetermined factors. These factors can include whether certain materials are available for a component through a fulfillment service, any physical constraints of a component, and so on. The reference library 135 can also include information regarding positioning of a component, possible options for the given item when it is placed in a certain position, and so on. For example, the reference library 135 can include information that two tables share mounting brackets and one or more legs when they are positioned in a back to back position.

As such, FIG. 1C shows that the "Type" component 153 of object 105a includes a set of options 155, which includes a "Circle" option 180 and a "Rectangle" option 160. Since the "Rectangle" type of table is specified in the attribute 130a, the program code 150a of the object 105a automatically selects the "Rectangle" option for this object 105a. In other examples, however, the program code 150*a* can identify another feature that has been selected by the user, such as the material or color type for the table, such that the program code 150*a* may actually select a circle table in the initial object 105*a* based on potential sub-option data, which is a better fit within the design context. Nevertheless, FIG. 1C shows that the design software creates a new child object 110*a* based on the previously selected option of rectangle 160.

In particular, the design software consults the reference library 135 and determines that the determined option "Rectangle" 160 has additional sub-options that are to be considered. The design software also determines that the determined option "Rectangle" 160 provides a basis for new object 110*a* that has a type component 161 at least for "Rectangle Table Leg". One will appreciate that there may be several different resulting "Type" components that are based on the determined initial option of "Rectangle" 160, which in turn will be used as corresponding "Type" components for a new child object. In this example, only one corresponding child component is shown for purposes of convenience.

For example, FIG. 1C shows that type 161 in object 110*a* also has a set of options 163, based on information from reference library 135, which includes a "Round leg" option 165*a* and a "Square leg" option 165*b*. Since the user failed to specify a type of leg in the attribute 130*a* in this example, program code 150*b* in object 110*a* automatically determines a default option component of "Round Legs" 165*a*. In other examples, the program code 150*a* might identify another feature that has been selected by the user, such as the material or color for the table, such that the program code 150*a* tries to find a leg in object 110*a* that can be used within the context of a potential sub-option. Nevertheless, in the present example, FIG. 1C shows that program code 150*b* selects the round leg option 165*a*.

Upon selection, the design software consults reference library 135 to identify if any additional "Types" or "Options" need to be propagated to a next child object based on the determined round leg option 165*a* from object 110*a*. In this case, FIG. 1C shows that the "Round Legs" type 165*a* in object 110*a* provides a basis for a new object 115*a*, which has a "Type" component 166 of "Round Leg Material". As before, and based on information in reference library 135, this new type 166 also has a set of options 167 that include "Material A" 170*a*, "Material C" 170*b*, and "Material D" 170*c*. The program code 150*c* for object 115*a* then references the user's attributes 130*a* to determine which of these options to select. Since the user selected "Material B", which is still a valid attribute at this point, and "Material B" is not one of the available options for "Round Leg Material", program code 150*c* selects a default option, such as "Material A".

As with objects 105*a* and 110*a*, the design software consults reference library 135, and identifies that the determined option of "Material A" 170*a* provides a basis for still another child object, which has a new type component and set of corresponding options. Accordingly, FIG. 1C shows that the design software creates child object 120*a* that depends from object 115*a*, and which has "Material A Color" 171 as its type component. Again based on information from the reference library 135, this type component 170*a* is determined to have a set of options 173 for color, such as option 175*a* for "Color A", option 175*b* for "Color C", and option 175*c* for "Color D".

Program code 150*d* then refers to the initial attributes 130*a* to determine the appropriate option. Since "Color B" is not available as an option of the "Material A Color" type 171, program code 150*d* determines another appropriate color. In particular, FIG. 1C shows that program code 150*d* has selected option component 175*a* for "Color A". As before, the program code can make this determination based on any number of factors, such as the closeness in color between "Color B" and "Color A". Since the selection "Color A" 175*a* does not have any additional sub-options in this example, the design software does not need to continue creating any additional child objects. As such, object 120*a* is the final object in this set of objects stemming from the initial type component of "Rectangle Table" in object 105*a*.

FIG. 1D illustrates another detailed schematic diagram of one or more of the objects shown in FIG. 1B, or the objects of FIG. 1C after receiving additional user input 125*b* that changes a datum in any of the object 105*a*, 110*a*, 115*a*, or 120*a*. In particular, FIG. 1D shows that the design software receives user input 125*b*, which includes attribute 130*b*, and simply changes one initial attribute of 130*a*. That is, the user has selected a "Circle Table", which represent a change from the prior selection of "Rectangle Table". As will be understood from the following description, this change in attributes 130*a* (now 130*b*) results in a fundamental change in the object 105*a* to object 105*b*, which can further result in corresponding additional changes in the following child objects.

For example, program code 150*a* automatically changes the option selection for type 153, such that the object 105*a* now has a selected option of "Circle" 180, and hence becomes object 105*b*. In contrast with the selected "Rectangle" table option in FIG. 1C, however, FIG. 1D shows that the design software consults the reference library 135, and identifies a new set of types and options that are at least partially different from those determined for "Rectangle" table. As such, the design software creates a new child object 113*a*, having "Circle Table Legs" 181 as its type, and a set of options 183 that include options for "Round Legs" 185*a*, as well as for "Pentagonal Legs" 185*b*.

By way of explanation, FIG. 1D also shows that object 113*a* has a different part number (i.e., "113*a*") from object 110*a*, even though it has the same program code 150*b*, to reflect that the objects are different in some respects and identical in others in this case. This need not necessarily be the case each time an object is changed or created. For example, the program objects 110*a* and 113*a* may be identical objects in nearly all respects except for option selections, or may be entirely different objects using different program code. Generally, the design software can determine whether to create a new object or based on a previously determined option, or whether to simply reuse and alter a previous object (e.g., object 105*a* changing to object 105*b*) with new (or partly new) information.

In any event, with the change from rectangular to circular tables, program code 150*b* of object 113*a* also determines the appropriate leg option for the new type 181 by referring to the updated set of attributes 130*b*. In this case, all that has changed is table style, such that the user's original set of preferences 130*a* for "Material B" and "Color B" are still maintained, and there are no indicated preferences for leg type. In this case, therefore, the program code 150*b* determines that the pentagonal legs option 185*b* has one or more additional sub-options for material, at least one of which is consistent with the previously indicated attribute (e.g., 130*a*) for using "Material B". Thus, program code 150*b* selects "Pentagonal Legs" for object 113*a*. The design software then consults reference library 135 based on the determined option 185*b*, and identifies that this determined option provides a basis for a new child object, with new type and options components. In particular, FIG. 1D shows that the design software generates the next child object 117a with "Pentagonal Legs Material" as the new type 186.

FIG. 1D also shows that the "Pentagonal Legs" type 186 in object 117a has a set of options 187, which, in addition to "Material B" 190a, also include "Material E" 190b. Nevertheless, the program code 150c automatically selects option component "Material B" 190a based on the current set of valid attributes 130b. As before, the design software then consults reference library 135, and identifies that the determined option 190a is a basis for another type and set of options related to material color. Accordingly, FIG. 1D shows that the design software then creates a corresponding next dependent child object 123a, which has "Material B Color" as its type 191, which further has a set of options 193. In particular, FIG. 1D shows that the set of options 193 include an option 195a for "Color B", and an option 195b for "Color E". Nevertheless, program code 150d references the valid attributes of 130a-b, and selects option component 195a for "Color B".

Accordingly, the schematic diagrams of FIGS. 1A through 1D show that design software in accordance with the present invention can propagate data associated with user input throughout a single data structure of related objects, where each object determines its match or best fit with the user input. In addition, the schematic diagrams of FIGS. 1A through 1D show how each created object in the data structure can be configured to independently resolve present and subsequent user input in a manner that is consistent with original user input.

The preceding examples, however, are only one example of how objects in a data structure can change in accordance with multiple user design choices. For example, the preceding examples can also be applied to physical rules regarding placement of design elements, such as the table or chair. In particular, the design software can also be configured with rules regarding possible orientations, as well as logical placements of tables in a design space, such as by prohibiting a table from an upside down configuration, or from placing the table on top of a wall. It will be appreciated, therefore, that the concepts of limiting a user selection in one instance, and allowing the user selection in another instance, or vice versa through a common data structure, can be applied to a wide range of functions with design software in accordance with implementations of the present invention. In particular, the concepts described herein provide at least for continually resolving user input in a manner that is consistent with possible, or real-world, values using a data structure of interrelated, at least partially independently-operating, data objects.

Additional and alternative descriptions for creating resolvable objects in a design space are described in commonly-assigned U.S. patent application Ser. No. 11/204,421, filed on Aug. 16, 2005, and entitled "Capturing a User's Intent in Design Software". Descriptions for efficiently representing the data of resolvable objects in accurate two or three-dimensional views of a user interface are described in commonly-assigned U.S. patent application Ser. No. 11/204, 419, filed on Aug. 16, 2005, and entitled "Design Software Incorporating Efficient 3-D Rendering". The entire content of each of the aforementioned patent applications is incorporated by reference herein.

Figure 2:
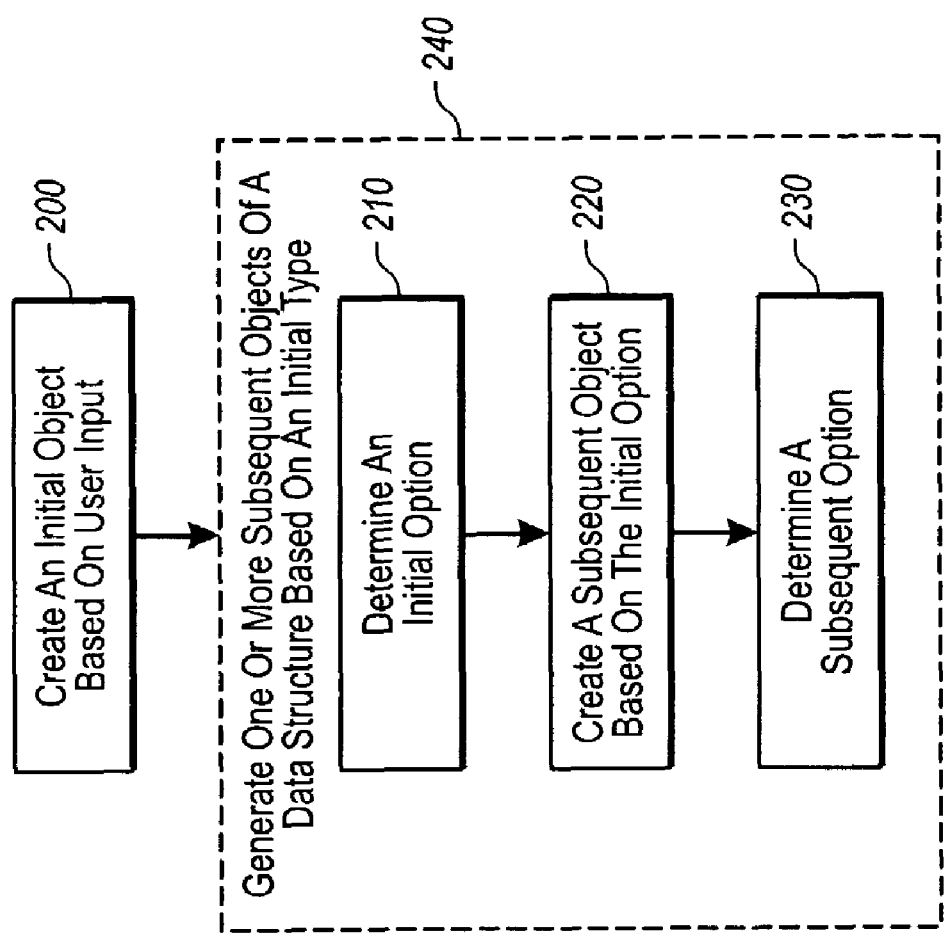
FIG. 2 illustrates one or more non-functional acts of, and a functional step for, accomplishing a method of automatically resolving the user's design choices, such that the user's design choices can be represented in an accurate way.

The present invention can also be described in terms of a functional step and non-functional acts for accomplishing a method in accordance with the present invention. In particular, FIG. 2 illustrates a method having one or more non-functional acts of (and a functional step for) accomplishing a method of automatically resolving the user's design choices, such that the user's design choices can be represented in an accurate way. The acts and steps of FIG. 2 are described below with reference to the schematic diagrams in FIGS. 1A through 1D.

As a preliminary matter, FIG. 2, the corresponding claims, and the claim text also include some reference to "initial" and/or "subsequent" acts or steps. It should be appreciated, however, that these designations are primarily to suggest positions of sequence at some point in a continuum, such that an "initial" act may or may not be a first act in a sequence, but is at least prior to a "subsequent" act. In addition, a "subsequent" act need only be after an "initial" act at some point, and is therefore not necessarily immediately after an "initial act". Along similar lines, the terms "first" or "second" (or "third", etc.) typically refer to the first time the relevant component (e.g., object) is identified, though the component may not necessarily be the first created or first used component, and may not necessarily occur in sequence before a "second" or "third" mentioned component. For example, object 117a could be a "first" or an "initial" object within the context of a given claim, though object 105b might ordinarily be the first or initially created object in the given context.

In any event, FIG. 2 shows that a method of automatically resolving the user's design choices comprises an act 200 of creating an initial object based on user input. Act 200 includes creating an initial object based on user design input having one or more attributes, the initial object including an initial type that relates to the one or more attributes. For example, a user input 125a includes a set of attributes 130a that reflect one or more aspects of the input, or of the user's intentions. Based on the user input 125a, the design software consults reference library 135, and creates an initial object (e.g., 105a) that has a type component (e.g., 153) and a set (e.g., 155) of one or more option components (e.g., 180, 160).

In addition, the method illustrated in FIG. 2 comprises a step 240 for generating one or more subsequent objects based on an initial type. Step 240 includes generating one or more subsequent objects based at least in part on the initial type, such that each of the initial and one or more subsequent objects are able to remain updated in real-time despite other user input that changes any of the initial or subsequent objects in the data structure. For example, a data structure (e.g., 100) includes one or more parent objects, and one or more child objects (e.g., objects 110a-d) that each have a "Type" component that is based on a previously determined "Option" in a prior parent object (e.g., 105a). With reference for example to FIG. 1A, object 110a has a type 161 that is based on a determined option 160 object 105 a, while object 110a has a type component 166 that is based on the determined option 165a of object 110a. If a user changes any element of the initial object (e.g., 105a), or of the initial attributes (e.g., 130a), or of data in a subsequent object (e.g., 115a), each child or parent object in the data structure, in turn, automatically resolves itself in accordance with the new user input.

Although step 240 can be performed by any number or order of corresponding acts, FIG. 2 shows that step 240 comprises an act 210 of determining an initial option. Act 210 includes determining an initial option for the initial type based on any of the one or more attributes. For example, as shown in FIG. 1C, an object 105a is created with "table" as the type 153, which is based on an indication for the rectangle table in the selected attributes 130a in the user input 125a. Although, in this example, the program code 150a for object 105a determines "Rectangle" as the option, since no option for the circle table would ultimately provide "Material B" as a selectable option in a subsequent child object (e.g., 115a, 120a). Thus, when determining an appropriate option for type 153 in object 105a, the program code 150a can determine an option that is as good a fit as possible given the initial type, or can simply choose a default option where the user's intent (e.g., "Material B") will never become available in a subsequent child object (e.g., 115a).

In addition, as shown in FIG. 2, step 240 comprises an act 220 of creating a subsequent object based on the initial option. Act 220 includes creating a subsequent object based on the determined initial option, wherein the determined initial option provides a basis for a subsequent type for the subsequent object. For example, as shown in FIG. 1C, when the program code 150a of object 105a selects option 160 for "Rectangle", the design software also consults reference library 135, and creates (or reuses) a subsequent child object (i.e., object 110a), which has a "Type" 161 that is based on the determined option 160.

Step 240 also comprises an act 230 of determining a subsequent option. Act 230 includes determining a subsequent option for the subsequent object based on any of the one or more attributes. For example, object 110a has a type 161 that is based on previously determined option 160 from parent object 105a. In addition, the type 161 for child object 110a itself has a set 163 of one or more options 165a-b. Program code 150b in object 110a then determines the appropriate option based at least in part on the existing set of valid attributes, such as attributes 130a. If no selected attribute matches an available option, the program code 150b can select a more appropriate (or even a default) option 170a. For example, program code 150b in object 110a selects "Round Legs" since no leg preference is specified in attributes 130a, and neither "Round Legs" nor "Square Legs" have "Material B" or "Color B" as a sub-option.

On the other hand, if the user later enters different user input, such as input 125b, the program code 150b for the corresponding object (e.g., object 113a) might then select or determine an option that is identical to the user's previous indication in attributes 130a. For example, as shown in FIG. 1D, the user has entered new input 125b that changes the attributes 130a to become attributes 130b, having selected a "Circle" option 180 in object 105a (now 105b). In a subsequently created object 113a, the program code 150b then determines "Pentagonal Legs" 185b as the appropriate option, since this option has a possible sub-option that matches "Material B" and/or "Color B". Accordingly, the schema and methods described herein provide a number of elements for ensuring that a user's intent is captured appropriately, and in a consistent, timely manner.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3 an exemplary system for implementing the invention includes a general-purpose computing device in the form of a conventional computer 320, including a processing unit 321, a system memory 322 and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326 containing the basic routines that help transfer information between elements within the computer 320 such as during start-up, may be stored in ROM 324.

The computer 320 may also include a magnetic hard disk drive 327 for reading from and writing to a magnetic hard disk 339 a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disc drive 330 are connected to the system bus 323 by a hard disk drive interface 332 a magnetic disk drive-interface 333 and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325 including an operating system 335 one or more application programs 336 other program modules 337 and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320 although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354 a wireless link, or other means for establishing communications over the wide area network 352, such as the Internet. The modem 354 which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. In a computerized architectural design environment in which a design program receives multiple inputs from a user regarding design choices in an interior or exterior space, a computer-implemented method of automatically resolving the user's design choices through independently resolvable objects, such that the resolvable objects aid the design program in rendering output of physically or materially-possible solutions for the user's design choices through a display device, comprising the acts of:

receiving user architectural design input with respect to an interior or exterior physical space, the user design input having a set of one or more initial attributes that are used to define the basis of multiple types or options in a data-structure;

automatically creating an initial object based on the set of one or more initial attributes, wherein the initial object includes an initial type that is the same as one of the one or more initial attributes;

automatically determining an initial option off the initial type in the initial object based another of the one or more initial attributes received in the user design input;

automatically creating a subsequent object based on the determined initial option, wherein the determined initial option provides a basis for a subsequent type for the subsequent object;

automatically determining a subsequent option for the subsequent object based on any of the one or more initial attributes received in the user design input; and rendering display output that reflects the automatic determinations of the initial or subsequent options.

2. The method as recited in claim 1, wherein determining an initial option comprises:

identifying that one of the one or more initial attributes corresponds to an available option for the initial type; and selecting the available option as the initial option, such that the selected available option provides a basis for the subsequent type for the subsequent object.

3. The method as recited in claim 1, wherein determining an initial option comprises:

identifying that the one or more initial attributes fail to match any available options for the initial type; and automatically determining, via program code in the initial object, an option that is an approximate or best match for any of the one or more initial attributes; and automatically selecting, via the program code in the initial object, the approximate match option as the initial option in the initial object, such that the selected approximate match option provides a basis for the subsequent type in the subsequent object.

4. The method as recited in claim 3, further comprising receiving a next user design input having one or more next attributes, at least one of the one or more next attributes being different from any of the one or more initial attributes, such that at least one of the one or more initial attributes are changed, and such that one or more of the initial attributes have not changed.

5. The method as recited in claim 4, further comprising automatically determining, via program code in the subsequent object, a new subsequent option for the subsequent object based on the next user design input.

6. The method as recited in claim 4, further comprising automatically determining, via the program code in the initial object, a new initial option for the initial object based on the next user design input, such that the subsequent type of the subsequent object is based on the new initial option.

7. The method as recited in claim 6, wherein the automatically determined new initial option corresponds to the at least one of the one or more next attributes in the received next user design input that are different from any of the one or more initial attributes.

8. The method as recited in claim 4, further comprising:

changing the initial type of the initial object based on the next user design input;

determining that an available option for the changed initial type corresponds to one of the one or more initial attributes that has not changed; and changing the initial option to the available option.

9. The method as recited in claim 1, further comprising:

consulting a reference library based on the determined subsequent option; and identifying that the determined subsequent option corresponds to one or more additional new types and options.

10. The method as recited in claim 9, creating a new object having one of the one or more additional new types as the new object's type, such that the determined subsequent option provides a basis for the new type of the new object.

11. The method as recited in claim 9, wherein each of the initial, subsequent, and new objects comprise program code that is configured to determine match, or an approximate match option for the corresponding initial, subsequent, or new object.

12. The method as recited in claim 11, further comprising the acts of:
   determining, via computer program code in the new object, that an available color option is an approximate match to a color in the new user design input; and
   the computer program code in the new object selecting the approximate color match as the subsequent option for the new object.

13. In a computerized architectural design environment in which a design program receives multiple inputs from a user regarding design choices in an interior or exterior space, a computer-implemented method of automatically resolving the user's design choices through independently-resolvable objects, such that the resolvable objects aid the design program in rendering output of physically or materially-possible solutions for the user's design choices, comprising the following:
   an act of the design program receiving user design input with respect to an interior or exterior physical space, the user design input having a set of one or more initial attributes that are used to define the basis of multiple types or options in a data-structure;
   an act of automatically creating an initial object based on one or more initial attributes, the initial object including an initial type that is the same as at least one of the one or more initial attributes; and
   a step for the design program automatically generating and resolving one or more subsequent objects based at least in part on the initial type, such that each of the initial and one or more subsequent objects are able to remain updated in real-time based on the received one or more initial attributes in the user design input, despite subsequent user input that changes any of the initial or subsequent objects in the data structure;
   wherein the automatic generation and automatic resolving by the design program ensures that physically or materially-possible solutions for the user's design choices are provided to the user.

14. The method as recited in claim 13, wherein the step for generating one or more subsequent objects in a single data structure comprises the acts of:
   automatically determining an initial option of the initial type in the initial object based another of the one or more initial attributes received in the user design input;
   automatically creating a subsequent object based on the determined initial option, wherein the determined initial option provides a basis for a subsequent type for the subsequent object;
   automatically determining a subsequent option for the subsequent object based on any of the one or more initial attributes received in the user design input; and
   rendering display output that reflects the automatic determinations of the initial or subsequent options.

15. In a computerized architectural design environment in which a design program receives multiple inputs from a user regarding design choices in an interior or exterior space, a computer-implemented method of automatically resolving the user's design choices through independently resolvable objects, such that the resolvable objects aid the design program in rendering output of solutions for the user's design choices, comprising the acts of:
   receiving a first design input from a user, the first input including a set of selected at least first and second attributes with respect to architectural design choices in an interior or exterior physical space;
   creating a first object of a data structure based on the first user design input, the first object including a first set of program code and a first type that matches the first input, the first type having one or more options that are different from the selected at least first and second attributes;
   automatically determining a first option of the one or more options for the first type based on a best fit comparison of the one or more options for the first type with the selected at least first and second attributes;
   automatically creating a second object in the data structure, the second object having a second type based on the determined first option, such that the second type is different from the selected at least first and second attributes; and
   rendering for display a solution based at least in part on the automatically determined best fit comparison for the first option of the one or more options for the first type.

16. The method as recited in claim 15, further comprising:
   receiving a new user input for the first object, the new user input having a new attribute that matches any of the selected at least first and second attributes;
   automatically changing the determined first option of the first object and the second type of the second object in accordance with the new attribute, such that the first option of the first object and the second type of the second object correspond with the any of the selected at least first and second attributes.

17. The method as recited in claim 15, further comprising determining a second option for the second type.

18. The method as recited in claim 17, further comprising:
   receiving a new input from the user related to a second option for the second object;
   determining that a different second type has a different second option that corresponds with the new input, and that the different second type is based on a possible option for the first type of the first object; and
   changing the first option, the second type, and the second option based on the new input.

19. The method as recited in claim 15, further comprising:
   consulting a reference library upon determination of the first option; and
   identifying that the first option corresponds at least with the second type.

20. In a computerized architectural design environment in which a design program receives multiple inputs from a user regarding design choices in an interior or exterior design space, a computer-implemented method of automatically resolving the user's design choices through independently resolvable objects, such that the resolvable objects aid the design program in rendering physically or materially-possible solutions for display of the user's design choices, comprising the acts of:
   identifying a reference library, the reference library including a designation of all types, options, or corresponding sub-options that are physically or materially possible in the interior or exterior design space;
   receiving user design input directed to the interior or exterior design space, the user input having a plurality of initial attributes including a first attribute, a second attribute, and a third attribute that conflict with one or more designations of the reference library, such that implementing the first attribute causes a conflict between the second attribute or the third attribute of the reference library;

automatically generating an initial set of resolvable parent and child objects that use the first attribute and one of the second or third attributes;

receiving subsequent user design input that changes the first attribute so that both the second and third attribute are consistent with the reference library designations at the same time; and automatically resolving the plurality of parent and child objects to reflect usage of both the second and third attributes;

rendering display output that reflects the automatic resolution of the plurality of parent and child objects.

21. At a computerized system in a computerized architectural design environment in which a design program receives multiple inputs from a user regarding design choices in an interior or exterior space, a computer-program storage product having computer-executable code stored thereon that, when executed, cause one or more processors of the computerized system to perform a computer-implemented method of automatically resolving the user's design choices through independently resolvable objects, such that the resolvable objects aid the design program in rendering output of physically or materially-possible solutions for the user's design, comprising:

receiving user architectural design input with respect to an interior or exterior physical space, the user design input having a set of one or more initial attributes that are used to define the basis of multiple types or options in a data-structure;

automatically creating an initial object based on the set of one or more initial attributes, wherein the initial object includes an initial type that is the same as one of the one or more initial attributes;

automatically determining an initial option of the initial type in the initial object based another of the one or more initial attributes received in the user design input;

automatically creating a subsequent object based on the determined initial option, wherein the determined initial option provides a basis for a subsequent type for the subsequent object;

automatically determining a subsequent option for the subsequent object based on any of the one or more initial attributes received in the user design input; and rendering display output that reflects the automatic determinations of the initial or subsequent options.

* * * * *

UNITED STATES PATENT AND TRADEMARK OFFICE
CERTIFICATE OF CORRECTION

PATENT NO. : 7,277,830 B2  Page 1 of 1
APPLICATION NO. : 11/204420
DATED : October 2, 2007
INVENTOR(S) : Barrie Arnold Loberg It is certified that error appears in the above-identified patent and that said Letters Patent is hereby corrected as shown below:

Column 10
Line 51, Change "FIG 1A" to --FIG 1C--
Line 53, Change "110a" to --115a--

Signed and Sealed this

Fifteenth Day of July, 2008

JON W. DUDAS
*Director of the United States Patent and Trademark Office*